United States Patent [19]

Yamada et al.

[11] Patent Number: 4,984,069
[45] Date of Patent: Jan. 8, 1991

[54] YC SEPARATOR FOR VIDEO SIGNAL PROCESSING CIRCUIT

[75] Inventors: Hiroshi Yamada, Yokohama; Yasutoshi Matsuo, Kawasaki, both of Japan

[73] Assignee: Victor Company of Japan, Ltd., Yokohama, Japan

[21] Appl. No.: 260,553

[22] Filed: Oct. 20, 1988

[30] Foreign Application Priority Data

Oct. 21, 1987 [JP] Japan .................................. 62-265887
Oct. 22, 1987 [JP] Japan .................................. 62-265350

[51] Int. Cl.$^5$ ............................................ H04N 9/78
[52] U.S. Cl. ........................................ 358/31; 358/40
[58] Field of Search ............................ 358/31, 40, 37

[56] References Cited

U.S. PATENT DOCUMENTS

| | | | |
|---|---|---|---|
| 4,345,268 | 8/1982 | Clarke | 358/31 |
| 4,688,080 | 8/1987 | Wagner | 358/31 |
| 4,703,342 | 10/1987 | Takahashi | 358/31 |
| 4,907,073 | 3/1990 | Sugiyama | 358/31 |
| 4,916,527 | 4/1990 | Matsuo | 358/31 |

OTHER PUBLICATIONS

European Search Report: EP 88 30 9897.

Primary Examiner—Tommy P. Chin
Attorney, Agent, or Firm—Fleit, Jacobson, Cohn, Price, Holman & Stern

[57] ABSTRACT

In a YC separator for generating a chrominance signal C including no chrominance separation error by selecting a second highest potential signal of the first chrominance signal a, the second chrominance signal c' including a separation error and a reference signal, only when a picture having two different colors at a border between n-th line and (n−1)th line is displayed, a correction value of ½ is generated as the reference signal, in order to obtain C=1 and Y=0 for prevention of n-th line dot crawl. Further, when a vertical stripe picture (black and white lines are alternately arranged) is displayed, a chrominance signal Cc including much less unnecessary signal components can be obtained through an arithmetic circuit and on the basis of a chrominance signal Cc' including error components and an average signal D between the past and future line chrominance signals A and C, in order to eliminate crosscolor at the upper and lower ends of the picture and Yc signal blur.

3 Claims, 12 Drawing Sheets

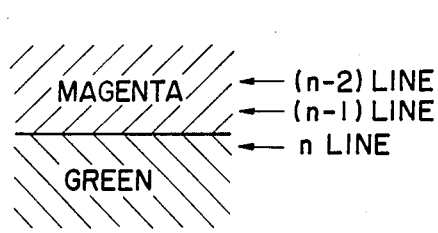
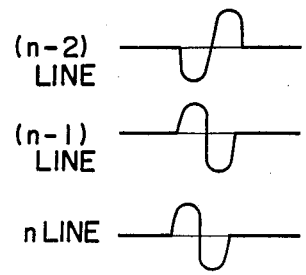
F I G. 3(A)　　　　F I G. 3(B)
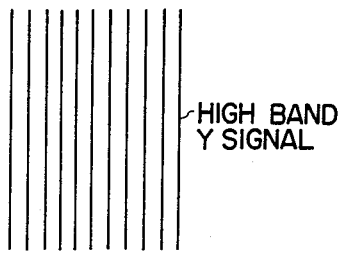
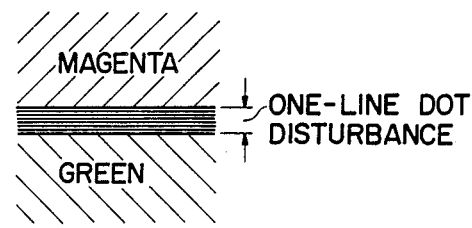
F I G. 4　　　　F I G. 5
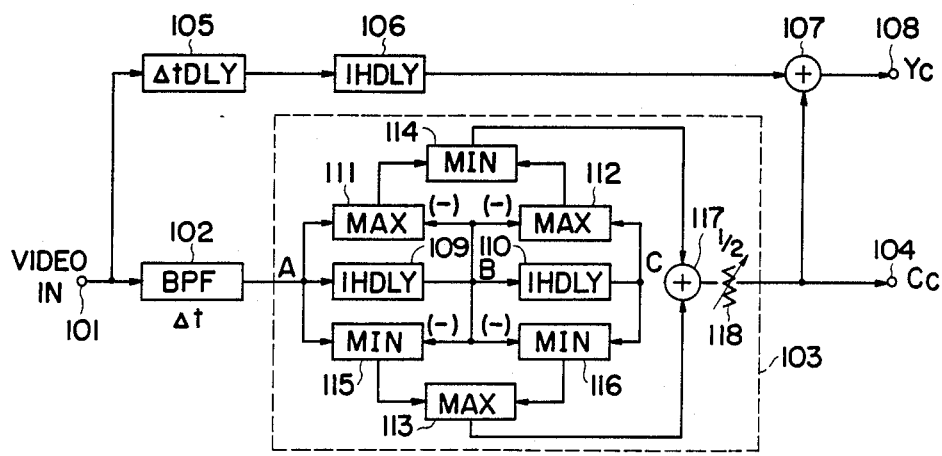
F I G. 6
PRIOR ART

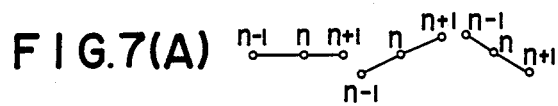
FIG.7(A)  FLAT PATTERN
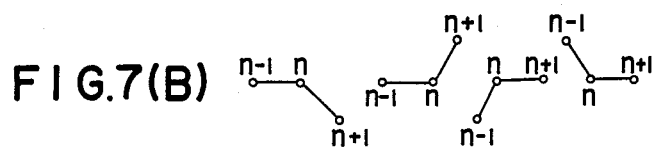
FIG.7(B)  STEP PATTERN
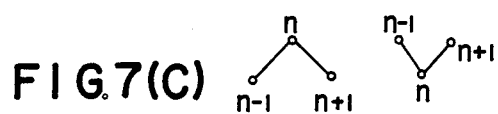
FIG.7(C)  PULSE PATTERN
FIG.9(A)    FIG.9(B)
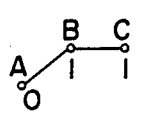 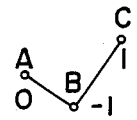
FIG.10(A)    FIG.10(B)

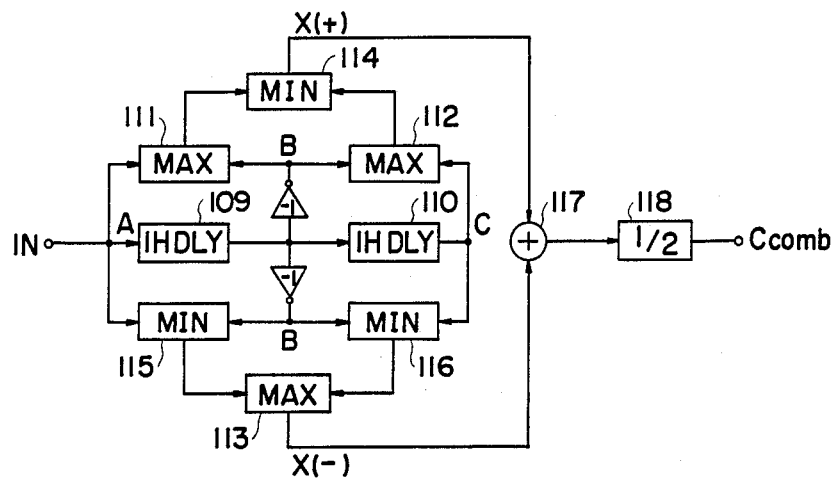
$$X(+) = \text{MIN}(B, \text{MAX}(A, C))$$
$$X(-) = \text{MAX}(B, \text{MIN}(A, C))$$
$$C\text{comb} = 1/2(X(+) + X(-))$$
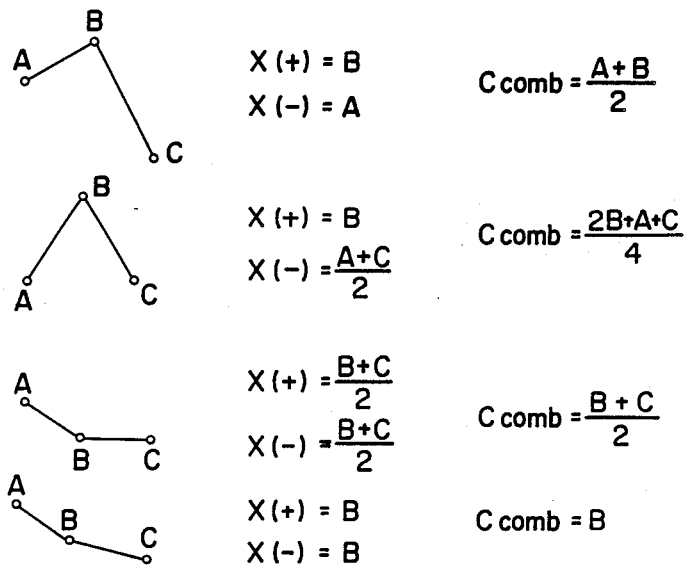
$X(+) = B$     $C\text{comb} = \dfrac{A+B}{2}$
$X(-) = A$
$X(+) = B$     $C\text{comb} = \dfrac{2B+A+C}{4}$
$X(-) = \dfrac{A+C}{2}$
$X(+) = \dfrac{B+C}{2}$     $C\text{comb} = \dfrac{B+C}{2}$
$X(-) = \dfrac{B+C}{2}$
$X(+) = B$     $C\text{comb} = B$
$X(-) = B$
FIG. 8
PRIOR ART

(PRIOR ART) (PRIOR ART)

| PATTERN | A | B | C | Cc' | D | E | Cc | Yc | Yc' | |
|---|---|---|---|---|---|---|---|---|---|---|
| A B C (n-1) (n) (n+1) | 0 | 0 | 0 | 0 | 0 | 0 | 0 | 0 | 0 | |
| | 1 | 1 | 1 | 0 | 1 | 0 | 0 | 1 | 1 | |
| | 1 | 0 | -1 | 0 | 0 | 0 | 0 | 0 | 0 | |
| | 1 | $\frac{1}{2}$ | 0 | $-\frac{1}{4}$ | $\frac{1}{2}$ | $-\frac{1}{4}$ | 0 | $\frac{1}{2}$ | $\frac{1}{4}$ | ※1 |
| | 1 | 1 | 0 | $-\frac{1}{2}$ | $\frac{1}{2}$ | $-\frac{1}{2}$ | 0 | 1 | $\frac{1}{2}$ | ※2 |
| | 1 | 1 | -1 | -1 | 0 | 0 | -1 | 0 | 0 | |
| | 0 | 1 | 0 | $-\frac{1}{2}$ | 0 | 0 | $-\frac{1}{2}$ | $\frac{1}{2}$ | $\frac{1}{2}$ | |
| | -1 | -1 | -1 | 0 | -1 | 0 | 0 | 0 | 0 | |

FIG. 14

| Cc' | D | (-D) | Eout | Ccout |
|---|---|---|---|---|
| 0 | 0 | (0) | 0 | 0 |
| 0 | 1 | (-1) | 0 | 0 |
| 1 | 0 | (0) | 0 | 1 |
| 1 | 1 | (-1) | 0 | 1 |
| 1 | -1 | (1) | 1 | 0 |

FIG. 15

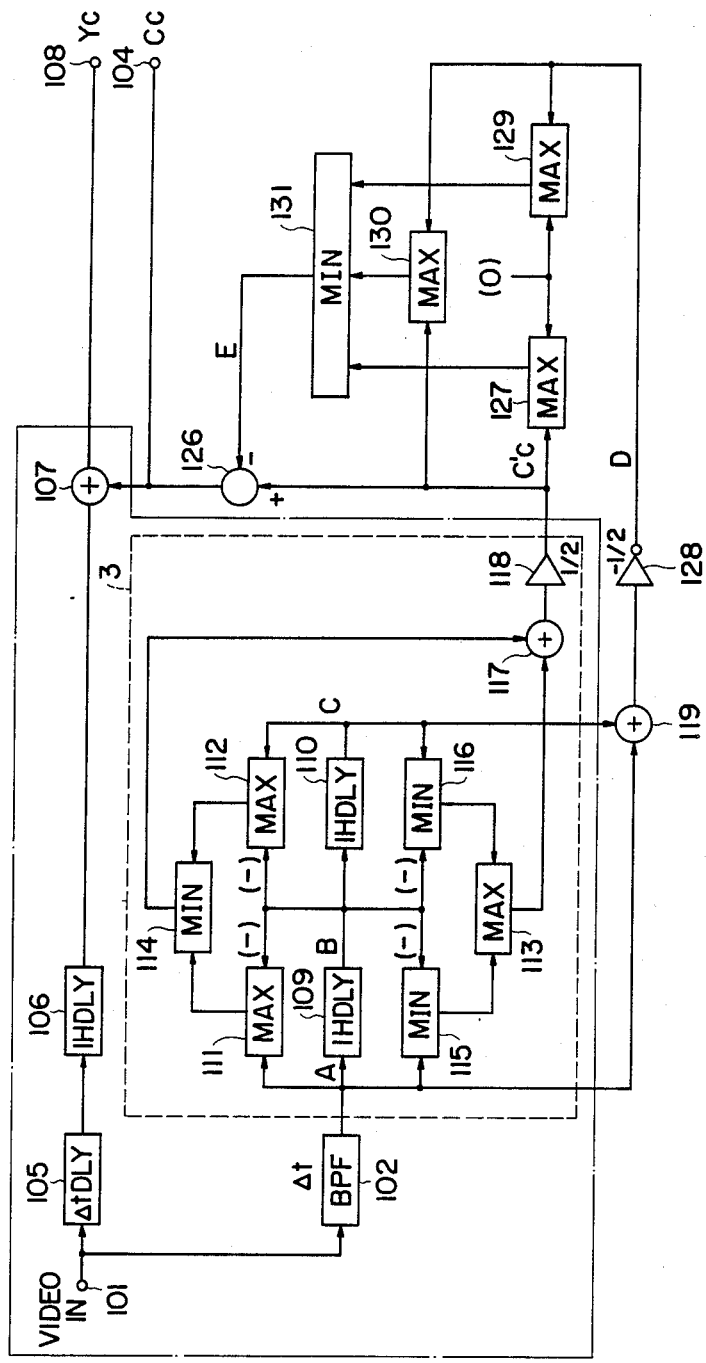
F I G. 16

YC SEPARATOR FOR VIDEO SIGNAL PROCESSING CIRCUIT

BACKGROUND OF THE INVENTION

1. Field of the Art

The present invention relates to a YC separator for a video signal processing circuit, and more specifically to a separator for separating a Y (luminance) signal and a C (carrier chrominance) signal from composite video signals in video cassette recorders, for instance.

2. Prior Art

The same applicant has already proposed Video Signal Processing Circuit in Japanese Patent Application No. 62-140921, which comprises, as shown in FIG. 1, a first circuit (bandpass filter) 12 for separating a composite video signal to obtain a first chrominance signal a including part of luminance signal components; a second circuit 10 for generating a second chrominance signal c' including a chrominace separation error signal by removing the luminance signal components from the first chrominance signal a; and a third circuit 11 for generating a chrominance signal c including no chrominance separation error signal by selecting the second highest potential signal from among the first chrominance signal a, the second color signal c' and a reference potential.

In FIG. 2, the reference numeral 2 denotes a 1 H delay circuit; 23 denotes a Δt delay circuit; 17 and 22 denote an adder, respectively; and 8 denotes a subtractor. Further, the numerals 13, 15, 18 and 21 denote MAX circuits or higher potential detectors, respectively, each of which is formed as shown in FIG. 2(A) to output one signal with a higher potential from between two input signals. The numerals 14, 16, 19 and 20 denote MIN circuits or lower potential detectors, respectively, each of which is formed as shown in FIG. 2(B) to output one signal with a lower potential from between two input signals.

A truth table of a circuit shown in FIG. 1 is listed in Table 1 below:

TABLE 1

| a | b | c' | c(C) | Y |
|---|---|---|---|---|
| 0 | 0 | 0 | 0 | 0 |
| 1 | 0 | 1 | 1 | 0* |
| 0 | 1 | −1 | 0 | 0* |
| 1 | 1 | 0 | 0 | 1** |
| 1 | −1 | 1 | 1 | 0 |
| −1 | 1 | −1 | −1 | 0 |

In Table 1 above, since C=1 or 0 at positions indicated by mark *, it is possible to improve the vertical resolution power required for small characters, for instance as compared with a prior-art comb filter where C=½, −½. This is because it is possible to eliminate half-tone or discoloration of the C signals generated at vertical transition portion of color bar signal or dot crawl generated at the Y signal due to the C signal.

In the prior-art circuit shown in FIG. 1, when magenta is displayed from the uppermost line to the (n−1)th line and green is displayed from the n-th line to the lowermost line on a picture as shown in FIG. 3(A), since C signals at two adjacent lines are opposite polarity to each other, for instance at the (n−2)th line and the (n−1)th line, a vertical correlation exists. However, since C signals are the same polarity, for instance of the (n−1)th line and the n-th line, no vertical correlation exists, as depicted in FIG. 3(B). In particular, at the border between the (n−1)th line magenta and the n-th line green (at which no vertical correlation exists), since a=1, b=1, C=0, and Y=1 as listed at position indicated by mark ** in Table 1, the C signal is apparently the same as the highband Y signal (a vertical correlation exists in Y signal).

In other words, all the C signal energy enters the Y signal side at the current n-th line as indicated by mark ** in Table 1. As a result, dot crawl occurs at n-th line as shown in FIG. 5, thus deteriorating the picture quality.

On the other hand, FIG. 6 shows another prior-art YC separator. In this circuit, a composite video signal (e.g. color bar signal) applied to a terminal 101 is passed through a bandpass filter 102 and a filter circuit 103 (described later in further detail) to generate a Cc (carrier chrominance) signal through a terminal 104. On the other hand, the composite video signal is supplied to an adder 107 via a Δt delay circuit 105 and a 1 H delay circuit 106, and then added to the Cc signal to generate a Yc (luminance) signal through a terminal 108. This YC separator utilizes a vertical correlation of video signals.

In the prior-art comb filter utilizing the vertical correlation, two-line vertical correlation is usually obtained on the basis of the present line information and the preceding (1 H past) line information. In this circuit shown in FIG. 6, however, the correlation is predicted by three lines of the present, 1 H past and 2 H past line information.

In the filter circuit 103, the above-mentioned three line information can be obtained by three signals A, B, and C, where signal A is an input signal (indicative of future), signal B is an output signal of a 1 H delay circuit 109 (indicative of present) and signal C is an output signal of another 1 H delay circuit 110 (indicative of past). In FIG. 6, the reference numerals 111, 112 and 113 denote higher potential detectors, respectively (referred to as MAX circuits), each of which outputs one higher potential signal of two input signals. The reference numerals 114, 115 and 116 denote lower potential detectors, respectively (referred to as MIN circuits) each of which outputs one lower potential signal of two input signals.

For example, when video signals of NTSC system are classified by selecting three lines when seen along the vertical direction in the picture, it is possible to obtain roughly three patterns as shown in FIGS. 7(A), (B) and (C). FIG. 7(A) shows a flat pattern; FIG. 7(B) shows a step pattern; and FIG. 7(C) shows a pulse pattern. Here, n denotes a current point on any given raster; (n−1) denotes a past point on the raster; and (n+1) denotes a future point on the raster. In the case of Cc signal, for instance, since the frequency of the subcarrier signal is $fsc=(455/2)fH$ where fH denotes the horizontal scanning frequency, when the vertical correlation exists, it is possible to obtain a pulse pattern as shown in FIG. 7(C), where the lines change alternately. This pulse pattern can be obtained by only the three line information.

FIG. 8 is a block diagram for assistance in explaining the basic operation of the filter circuit 103. The MAX circuit 111 outputs one higher potential signal A or B of the two signals A and B; the MAX circuit 112 outputs one higher potential signal B or C of the two signals B and C; the MIN circuit 114 outputs a lower potential output $X_{(+)}$ of the two outputs of the two MAX circuits 111 and 112, which can be expressed as $$X_{(+)} = \text{MIN (B, MAX (A, C))}.$$

In the same way, the MIN circuit 115 outputs a lower potential signal A or B of the two signals A and B; the MIN circuit 116 outputs a lower potential signal B or C of the two signals B and C; the MAX circuit 113 outputs a higher potential output $X_{(-)}$ of the two outputs of the two MIN circuits 115 and 116, which can be expressed as $$X_{(-)} = \text{MAX (B, MIN(A, C))}.$$

These two signals $X_{(+)}$, $X_{(-)}$ are added by an adder 117. The level of the added signal is reduced to a half via a $\frac{1}{2}$ circuit 118 and outputted as a chrominance signal $Cc = \frac{1}{2} X_{(+)} + X_{(-)}$). Here, in this circuit, the present line signal level is inverted for calculation in order to obtain the Cc signal earlier.

In this case, the transfer function of the filter circuit 103 can be expressed as $$C_{comb} = \tfrac{1}{2}(B + \text{MID}(A,B,C))$$

where MID(A,B,C) is a function to output the second highest data of three input signals A, B, and C. Therefore, the circuit shown in FIG. 8 generates four Cc signals according to four patterns.

In the prior-art circuit shown in FIG. 6, when a picture of vertical stripes (in which black and white lines are alternately arranged such as multiburst) as shown in FIG. 9(A) is displayed, there exists a problem in that cross color (originally colorless position is colored) is produced at the upper and lower ends of a picture as shown in FIG. 9(B) and the Yc signal blur occurs. In more detail, when there exist vertical stripes below the position B as shown in FIG. 9(A), the three line information of the upper end is A=0, B=C=1 as shown in FIG. 10(A). Since B is inverted to form the Cc signal, the information changes to A=0, B=−1, C=1. Therefore, $(-B+A)/2 = \frac{1}{2}$ is extracted from the transfer function $= \frac{1}{2}$ (B+MID(A, B, C)) as the Cc signal, so that there exists a problem (cross color) in that originally colorless positions are colored. On the other hand, there exists another problem in that blur occurs in the Yc signal because the amplitude thereof is reduced to half as $Yc = 1 - \frac{1}{2} = \frac{1}{2}$.

SUMMARY OF THE INVENTION

With these problems in mind, therefore, it is the primary object of the present invention to provide a YC separator for a video signal processing circuit which can improve the picture quality at positions where no vertical correlation exists with respect to the C signal.

It is another object of the present invention is to provide a YC separator for a video signal processing circuit which can improve the picture quality by eliminating cross-color at the upper and lower ends of a picture of vertical stripes in which black and white lines are alternately arranged such as multiburst and by eliminating blur in the Yc signal.

To achieve the above-mentioned first object, a YC separator for a video signal processing circuit according to the present invention comprises: (a) a first circuit for generating a first chrominance signal a including luminance signal components by separating a composite video signal; (b) a second circuit, responsive to said first circuit, for generating a second chrominance signal c′ including a chrominance separation error signal by removing luminance signal components from the first chrominance signal a on the basis of the first chrominance signal a and a first delayed chrominance signal b a predetermined line delayed from the first chrominance signal a; (c) a third circuit, responsive to said first and second circuits, for generating a chrominance signal C including no chrominance separation error signal by selecting a second highest potential signal of the first chrominance signal a, the second chrominance signal c′, and a reference potential; and (d) fourth circuit means, responsive to said second circuit, for outputting a correction signal of "$\frac{1}{2}$" to said third circuit as the reference potential when the first chrominance signal a, the first delayed chrominance signal b and a second delayed inverted chrominance signal −c″ obtained by inverting a second delayed chrominance signal c″ obtained by further delaying the first delayed chrominance signal b are all "1", but a signal of "0" to said third circuit as the reference potential when the above three signals a, b and −c″ are not "1" simultaneously.

To achieve the above-mentioned second object, a YC separator for a video signal processing circuit according to the present invention comprises: (a) a first circuit for separating a chrominance signal A from a composite video signal; (b) a second circuit, responsive to said first circuit, for generating a past line chrominance signal A, a present line chrominance signal B, and a future line chrominance signal C and generating a chrominance signal Cc′ including less unnecessary components on the basis of the three past, present and furture line chrominance signals A, B and C; (c) third circuit means, responsive to said second circuit, for generating an average signal D of the past and future line chrominance signals A and C; (d) fourth circuit means, responsive to said second and third circuits, for generating a lower level signal of the average signal D and the chrominance signal Cc′ when the average signal D is the same in sign as the chrominance signal Cc′, but a zero-level signal irrespective of levels of these two signals when these two signals are different in sign from each other; and (e) fifth circuit means, responsive to said second and fourth circuits, for generating a chrominance signal Cc including much less unnecessary components by subtracting either one of the lower or zero level signal from the chrominance signal Cc′ including less unnecessary components.

In the YC separator according to the present invention, when a picture having two different colors at a border between the n-th line and the (n−1)th line is desplayed, the n-th line signal is a=1; the (n−1)th line signal is b=1; and the (n−2)th line inverted signal is −c″=1. In this case, a correction value of $\frac{1}{2}$ is generated as the reference signal in order to obtain C=1 and Y=0 for prevention of n-th line dot crawl. In other cases, a correction value of 1 is generated as the reference signal for prevention of half-tone of the C signal and dot crawl of the Y signal.

Further, when a vertical stripe picture in which black and white lines are alternately arranged is displayed, A=1, B=$\frac{1}{2}$; and C=0 in flat pattern or A=B=1; and C=0 in step pattern. In this case, a chrominance signal Cc including much less unnecessary signal components can be obtained by the arithmetic circuit and on the basis of a chrominance signal Cc′ including error components and an average signal D between the past and future line chrominance signals A and C, so that it is possible to eliminate cross color at the upper and lower ends of the picture and Yc signal blur.

BRIEF DESCRIPTION OF THE DRAWINGS

The features and advantages of the YC separator for a video signal processing circuit according to the present invention will be more clearly appreciated from the following description taken in conjunction with the accompanying drawings in which:

FIG. 3(A) is an illustration for assistance in explaining each line signal when a picture is displayed by two vertically different colors;

FIG. 3(B) is three C signal waveforms for assistance in explaining a vertical correlation due to opposite polarity;

FIG. 4 is an illustration showing a highband Y signal picture;

FIG. 5 is an illustration for assistance in explaining one line dot crawl;

FIG. 6 is a block diagram showing another prior-art YC separator for a video signal processing circuit;

FIGS. 7(A), (B) and (C) are diagrams showing three patterns obtained by a three-line signals;

FIG. 8 is a diagram for assistance in explaining the Cc signal obtained by the prior-art filter circuit shown in FIG. 6;

FIGS. 9(A) and (B) are illustrations for assistance in explaining two multiburst pictures;

FIGS. 10(A) and (B) are diagrams showing two multiburst patterns;

FIG. 14 is a table listing various signals for comparison between the prior-art circuit and the circuit of the present invention;

FIG. 15 is a table listing various signals obtained by the circuit of the present invention;

FIG. 16 is a block diagram showing a third embodiment of the YC separator according to the present invention;

DETAILED DESCRIPTION OF THE PREFERRED EMBODIMENTS

Figure 1:
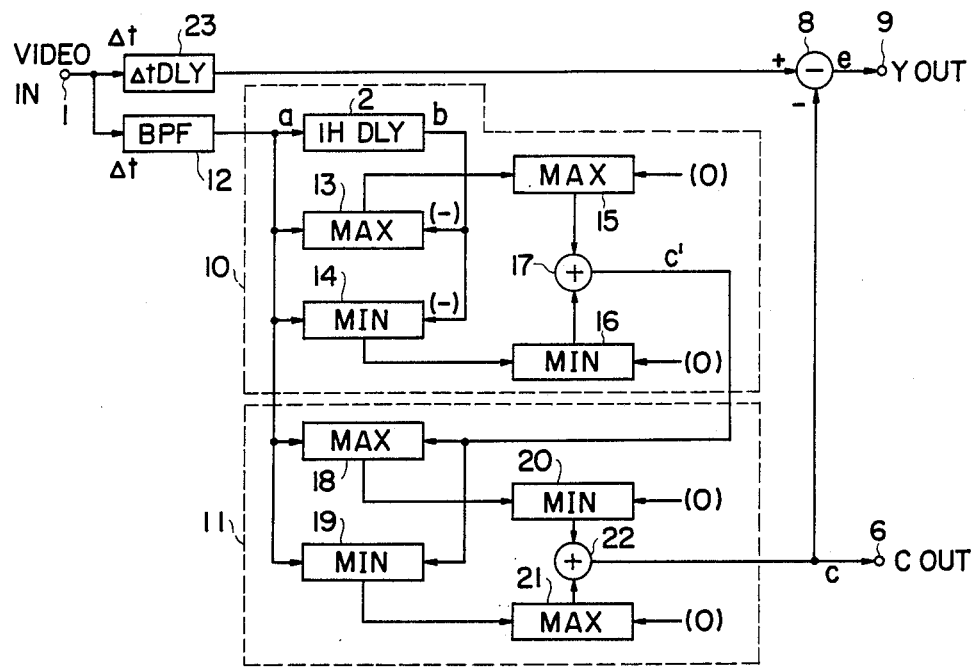
FIG. 1 is a block diagram showing a prior-art YC separator.
Figure 2A:
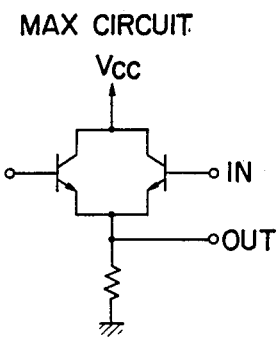
FIG. 2(A) is a circuit diagram showing a MAX circuit.
Figure 2B:
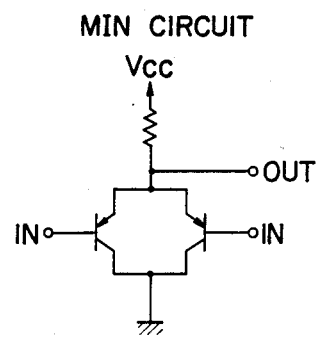
FIG. 2(B) is a circuit diagram showing a MIN circuit.
Figure 11:
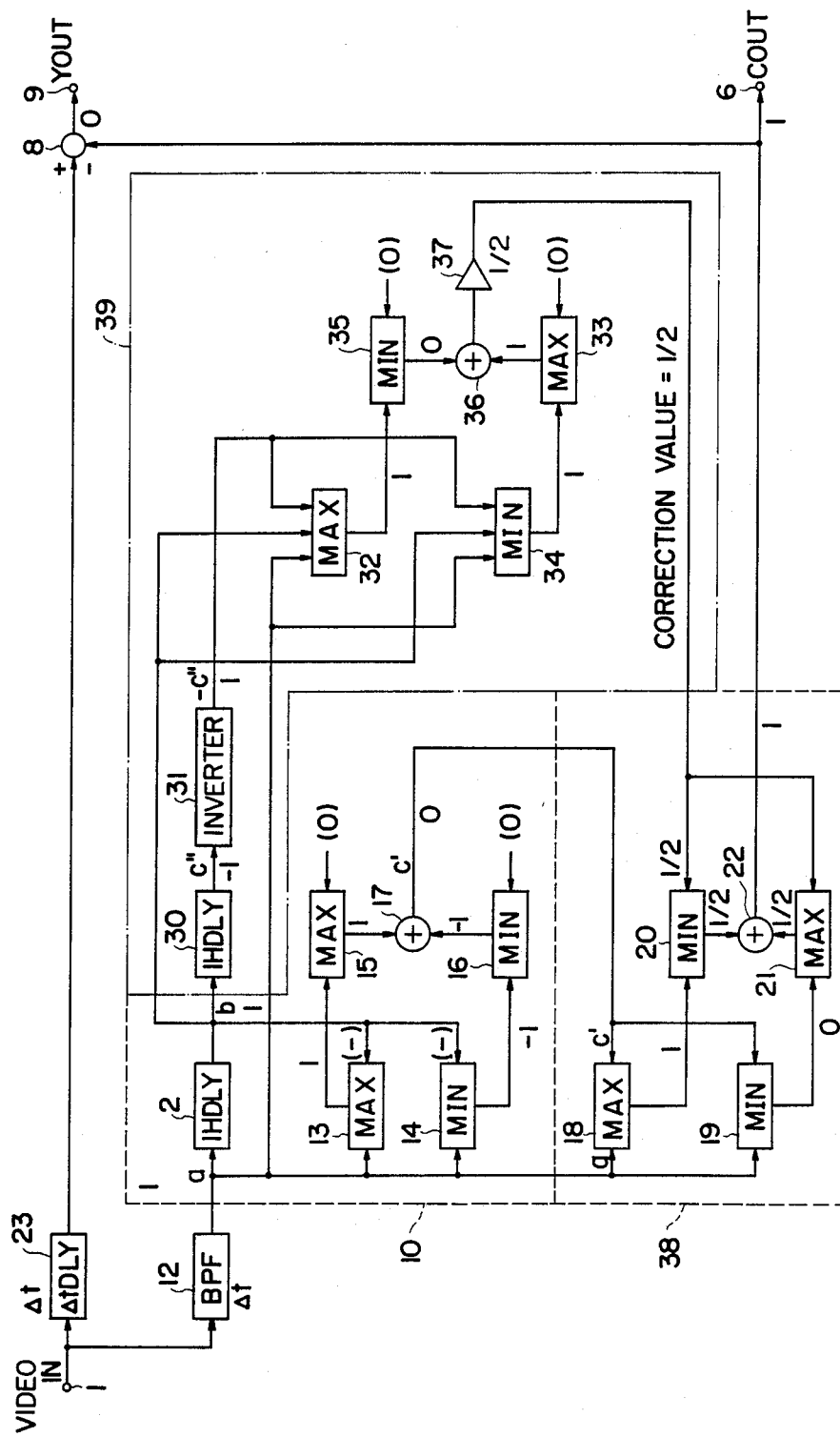
FIG. 11 is a block diagram showing a first embodiment of the YC separator according to the present invention.

FIG. 11 shows a first embodiment of the YC separator of the present invention, in which the same reference numerals have been retained for similar elements shown in FIG. 1. In the drawing, a circuit 39 enclosed by dot-dashed lines is newly added to the prior-art circuit shown in FIG. 1.

In FIG. 11, a 1 H delay circuit 30 delays an output of the 1 H delay circuit 2 further by 1 H; that is, if a signal a represents the present n-th line signal, this 1 H delay circuit 30 outputs a (n−2)th line signal $c''$ which is 2 lines before the n-th line. An inverter 31 inverts the output signal $c''$ of the 1 H delay circuit 30 to obtain a signal $-c''$. The reference numerals 32 and 33 denote MAX circuits; 34 and 35 denote MIN circuits; 36 denotes an adder; 37 denotes a ½ amplifier. A correction value can be obtained by these elements on the basis of three signals a, b and $-c''$ and applied to the MIN circuit 20 and the MAX circuit 21 as a reference potential.

The operation of the circuit 39 will be explained hereinbelow: The MAX circuit 32 detects the highest potential signal of three signals a, b and $-c''$. The MIN circuit 34 detects the lowest potential signal of three signals a, b $-c''$. These highest and lowest signals are supplied to the MIN circuit 35 and the MAX circuit 33, respectively. The MIN circuit 35 outputs a lower potential signal of a detected output of the MAX circuit 32 and a zero potential. The MAX circuit 33 outputs a higher potential signal of a detected output of the MIN circuit 34 and a zero potential. These two output signals of the MIN circuit 35 and the MAX circuit 33 are added by the adder 36. The level of the output from the adder 36 is reduced to ½ by the ½ amplifier 37 to obtain a correction value signal to be supplied to the MIN circuit 20 and MAX circuit 21 as a reference potential.

With reference to FIGS. 3(A) and (B) again, as explained above, if the present n-th line signal is determined as a=1, the (n−1)th line signal is b=1; and the (n−2)th line signal is $c''=-1$. On the other hand, since the highband Y signal shown in FIG. 4 are of the same polarity at all the lines as a=1, b=1, and $c''=1$, it is possible to distinguish both from each other.

In other words, as depicted in FIGS. 3(A) and (B), only when a=1; b=1; and $c''=-1$ ($-c''=1$), a correction value ½ can be obtained to generate "1" C signal and "0" Y signal. In other cases except the above, the correction value is set to "0", and the invention circuit shown in FIG. 11 operates quite the same as the prior-art circuit shown in FIG. 1. Table 2 below is a Truth table of the circuit of this embodiment, in which the position indicated by * corresponds to the case where a picture as shown in FIG. 3(A) is displayed.

TABLE 2

| a | b | $-c''$ | CORRECTION VALUE | C | Y |
|---|---|---|---|---|---|
| 0 | 0 | 0 | 0 | 0 | 0 |
| 0 | 0 | 1 | 0 | 0 | 0 |
| 0 | 1 | 0 | 0 | 0 | 0 |
| 0 | 1 | 1 | 0 | 0 | 0 |
| 0 | 1 | −1 | 0 | 0 | 0 |
| 0 | −1 | 1 | 0 | 0 | 1 |
| 1 | 0 | 0 | 0 | 1 | 0 |
| 1 | 0 | 1 | 0 | 1 | 0 |
| 1 | 0 | −1 | 0 | 1 | 0 |
| 1 | 1 | 0 | 0 | 0 | 1 |
| 1 | −1 | 0 | 0 | 1 | 0 |
| *1 | 1 | 1 | ½ | 1 | 0 |
| 1 | −1 | 1 | 0 | 1 | 0 |
| 1 | 1 | −1 | 0 | 0 | 1 |
| 1 | −1 | −1 | 0 | 1 | 1 |

Therefore, since the current n-th line C signal is "1" and the Y signal is "0" in the picture as shown in FIG. 3(A), it is possible to eliminate the one-line dot crawl as shown in FIG. 5 for providing a higher picture quality.

The circuit 38 composed of the MAX circuits 18 and 21, the MIN circuits 19 and 20, and the adder 20, as shown in FIG. 11, outputs a second highest potential signal of the signals a, c' and the reference potential (correction value). That is, as listed in Table 3 below, if the correction value is "0", the circuit operation is the same as in the prior-art circuit shown in FIG. 1; if the correction value is $\frac{1}{2}$, C=1.

TABLE 3

| a | c' | (CORRECTION: 0) c | (CORRECTION: $\frac{1}{2}$) c |
|---|----|----|----|
| 0 | 0 | 0 | |
| 1 | 0 | 0 | 1 |
| 0 | 1 | 0 | |
| 1 | 1 | 1 | |
| 1 | −1 | 0 | |
| −1 | 1 | 0 | |

In Table 3, when the correction value is $\frac{1}{2}$, a=1 and c'=0, the second highest potential of three signals is $\frac{1}{2}$. However, if the "$\frac{1}{2}$" C signal is outputted as it is, since this produces a half tone, C signal of "1" must be outputted. For this purpose, even if the correction value is "$\frac{1}{2}$", in practice, the C signal is outputted under the conditions that a=1; c'=0; and correction=1, because the second highest potential of three of a=1, c'=0, and correction=1 is "1".

Figure 12:
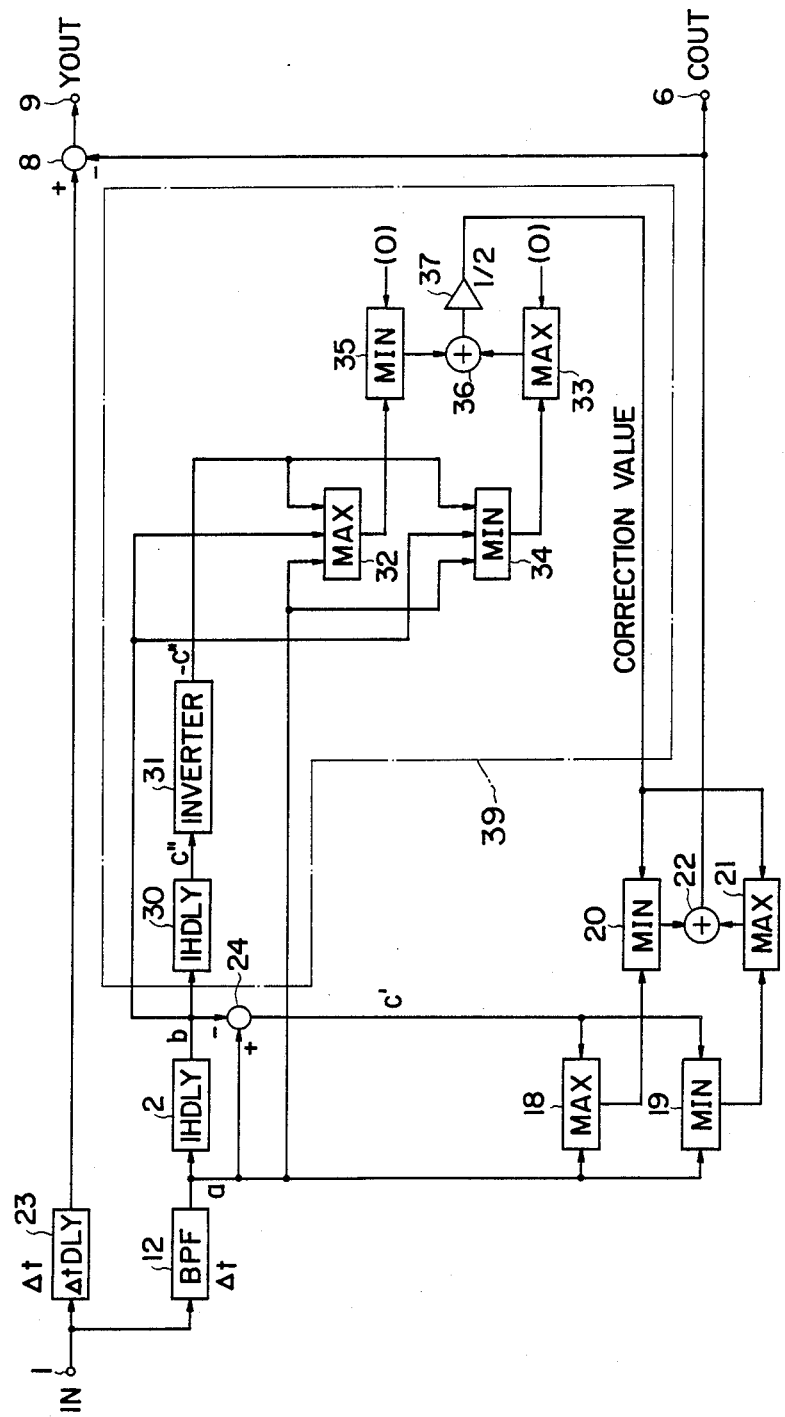
FIG. 12 is a block diagram showing a modification of the YC separator shown in FIG. 11.

FIG. 12 shows a modification of the circuit shown in FIG. 11, in which the same reference numerals have been retained for similar parts which have the same functions as in FIG. 11, without repeating the description thereof. In this circuit, the signal b is subtracted from the signal a by a subtractor 24 to obtain the sinal c'. Therefore, it is possible to simplify the circuit configuration as compared with that shown in FIG. 11 in spite of the same function.

Further, when both the circuits shown in FIGS. 11 and 12 are applied to a PAL system, two 2 H delay circuits are used in place of the 1 H delay circuits 2 and 30. In the PAL system, when a picture as shown in FIG. 3(A) is displayed, since the calculation error occurs over two lines, the dot crawl is more noticeable as compared with in NTSC system, so that the circuit of the present invention is more effective in the PAL system as compared with that in NTSC system.

As described above, in the YC separator according to the present invention, only when a picture at which color differs at a border between the current n-th line and the preceding (n−1)th line is displayed, a correction value of $\frac{1}{2}$ can be obtained, and it is possible to generate a C signal of "1" and a Y signal of "0" to prevent one-line dot crawl.

Figure 13:
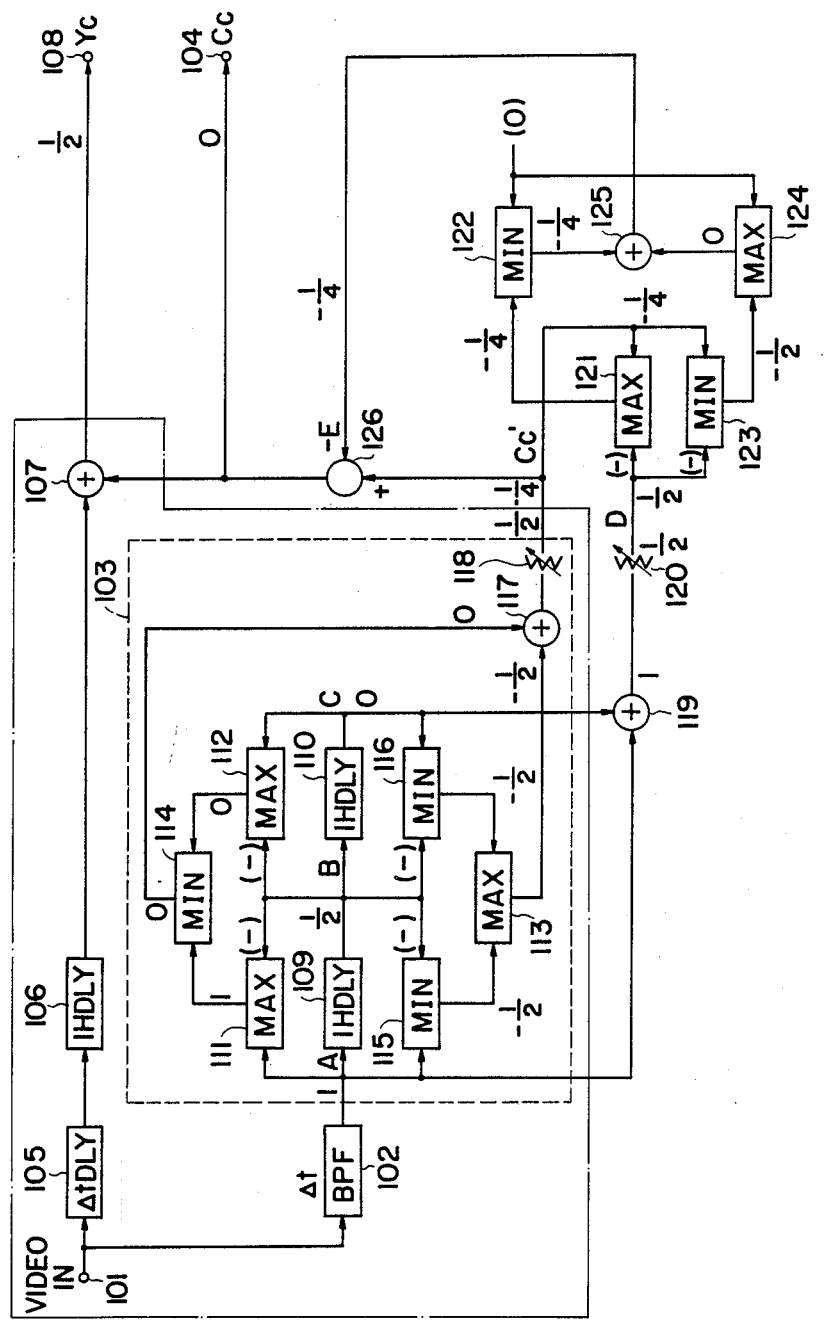
FIG. 13 is a block diagram showing a second embodiment of the YC separator according to the present invention.

FIG. 13 is a second embodiment of the YC separator of the present invention, in which the same reference numerals have been retained for similar elements shown in FIG. 6 without repeating the description thereof. Further, in the drawing, a section 103 enclosed by dot-dashed lines are the same as in FIG. 6.

In FIG. 13, a signal A and a signal C are added by an adder 119. The level of the output of the adder 119 is reduced to $\frac{1}{2}$ by a $\frac{1}{2}$ circuit 120 to obtain a signal D. Here, the output signal of the $\frac{1}{2}$ circuit 118 is designated as a signal Cc' to distinguish it from an output carrier chrominance signal Cc of the present embodiment. A MAX circuit 121 outputs a higher potential signal of the signal Cc' and the inverted signal −D, and a MIN circuit 122 outputs a lower potential signal of the output signal from the MAX circuit 121 and a zero level signal. On the other hand, a MIN circuit 123 outputs a lower potential signal of the signal Cc' and the inverted signal −D, and a MAX circuit 124 outputs a higher potential signal of the output signal from the MIN circuit 123 and a zero level signal. The output signal of the MIN circuit 122 and that of the MAX circuit 124 are added by an adder 125 and outputted as a signal E. This signal E is subtracted from the signal Cc' by a subtractor 126, and the subtracted signal Cc is outputted through a terminal 104.

FIG. 14 shows a table which indicates the relationship between some major patterns selected from among those shown in FIG. 7 and various signals Cc', D, E, Cc, Yc, Yc', in which the patterns are formed by combining three signals A, B and C of "0", "1", "$\frac{1}{2}$" and "−1", and the Yc signal is outputted through the terminal 108 in FIG. 6.

In FIG. 14, when A=1, B=$\frac{1}{2}$ and C=0 as denoted by mark *1, for instance, since three line information of past, present and future change continually in the order of 1, $\frac{1}{2}$, and 0, it is general to consider that vertical stripes are declined in the vertical direction. In this case, therefore, it is preferable to output a Cc signal of "0". In the prior-art circuit shown in FIG. 6, since the signal Cc' is "−$\frac{1}{4}$" as shown in FIG. 14, there exists a problem in that a cross color occurs. In the present invention, however, since the signal Cc is "0" also as shown in FIG. 14, no cross color will occur. On the other hand, in the prior-art circuit, the signal Yc' is "$\frac{3}{4}$". However, in the present invention, the signal Yc is $\frac{1}{2}$ as shown in FIG. 14. This indicates that it is possible to reduce blur.

Further, in FIG. 14, when A=B=1 and C=0 as denoted by mark *2 (a step pattern such as multiburst), it is preferable to output the signal Cc of "0" to eliminate cross color. In the prior-art circuit, however, since Cc'=−$\frac{1}{2}$, there exists a problem in that cross color will occur. On the other hand, in the prior-art circuit, the signal Yc' is "$\frac{1}{2}$". However, in the present invention, the signal Yc is "1". This indicates that it is possible to eliminate blur.

Further, in the positions other than those denoted by marks *1 and *2, the values are the same as those of the prior-art circuit shown in FIG. 6.

FIG. 15 shows the relationship between the output signals E and the signals Cc' and D(−D), in which when the sign of the signal Cc' is equal to that of the signal −D, one lower level signal of the two is outputted; and when the sign of the signal Cc' is different from that of the signal −D, a signal of "0" is outputted irrespective of the signal levels.

FIG. 16 shows a third embodiment of the present invention, in which the same reference numerals have been retained for similar elements shown in FIGS. 6 and 13 without repeating the description thereof.

In FIG. 16 a MAX circuit 127 outputs one higher potential signal of an output Cc' of the $\frac{1}{2}$ circuit 118 and a zero level signal. On the other hand, an output of the adder 119 is reversed in polarity and further reduced to $\frac{1}{2}$ in level by an −$\frac{1}{2}$ circuit 128. A MAX circuit 129 outputs one higher potential signal of the output D of the −$\frac{1}{2}$ circuit 128 and a zero level signal. A MAX circuit 130 outputs one higher potential signals of the output Cc' of the $\frac{1}{2}$ circuit 118 and the output D of the −$\frac{1}{2}$ circuit 128. Three output signals of the MAX circuits 127, 129 and 130 are supplied to a MIN circuit 131 to generate the lowest potential signal of these three signals as the signal E.

The basic operation of this third embodiment shown in FIG. 16 is almost the same as the second embodiment shown in FIG. 13.

Figure 17A:
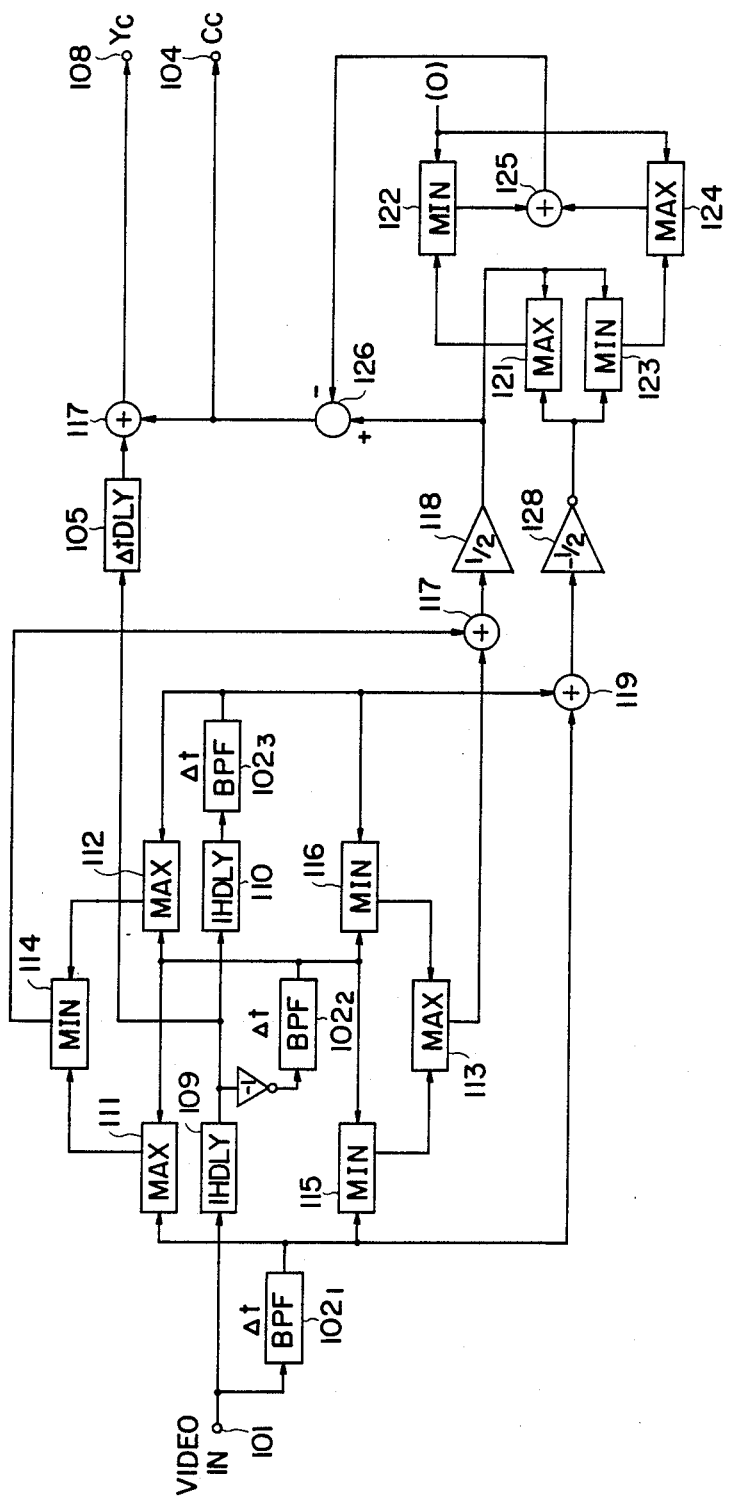
FIG. 17(A) is a block diagram showing a first modification of the YC separator shown in FIG. 13.

FIGS. 17(A), (B) and (C) show some modifications of the circuit of the present invention, in which the 1 H delay circuit 106 shown in FIG. 13 or 16 is used in common with the 1 H delay circuit 109 of the filter circuit 103. In the same way, the same reference numerals have been retained for similar elements shown in FIGS. 6 and 13 without repeating the description thereof.

Figure 17B:
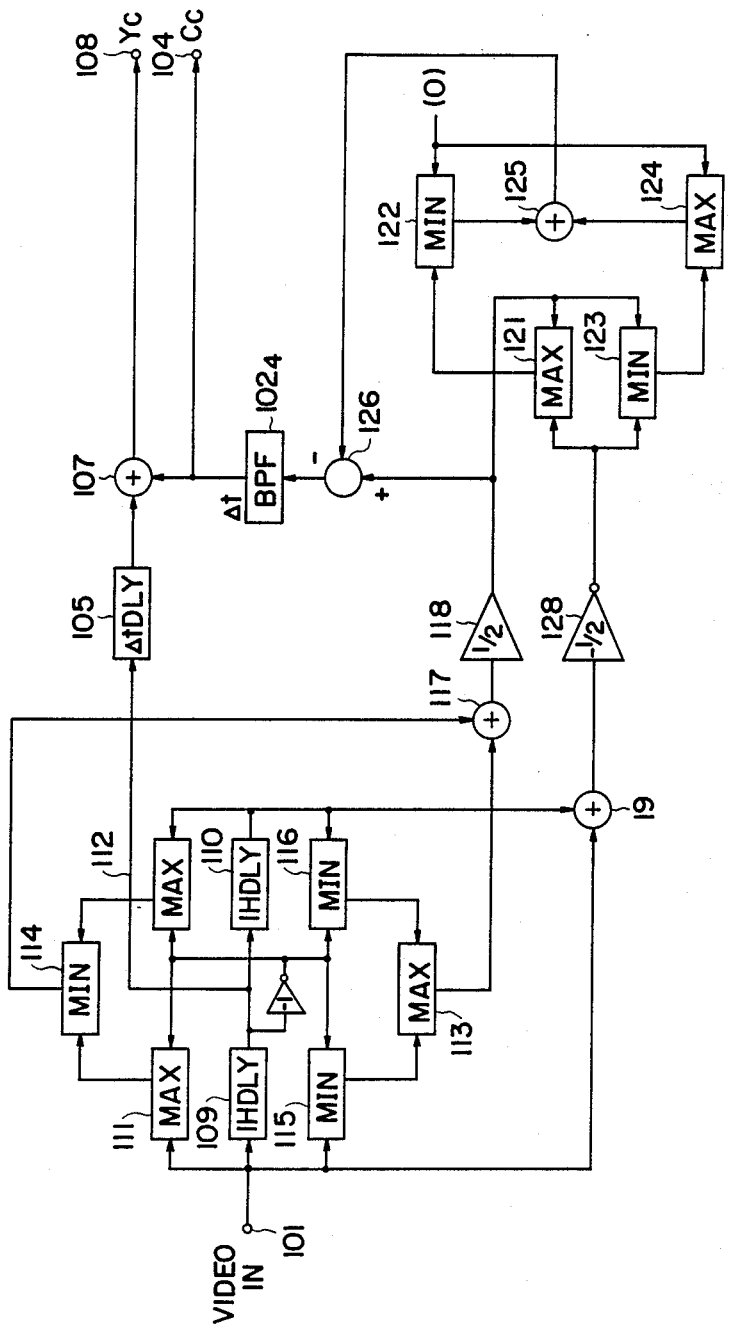
FIG. 17(B) is a block diagram showing a second modification of the YC separator shown in FIG. 13.
Figure 17C:
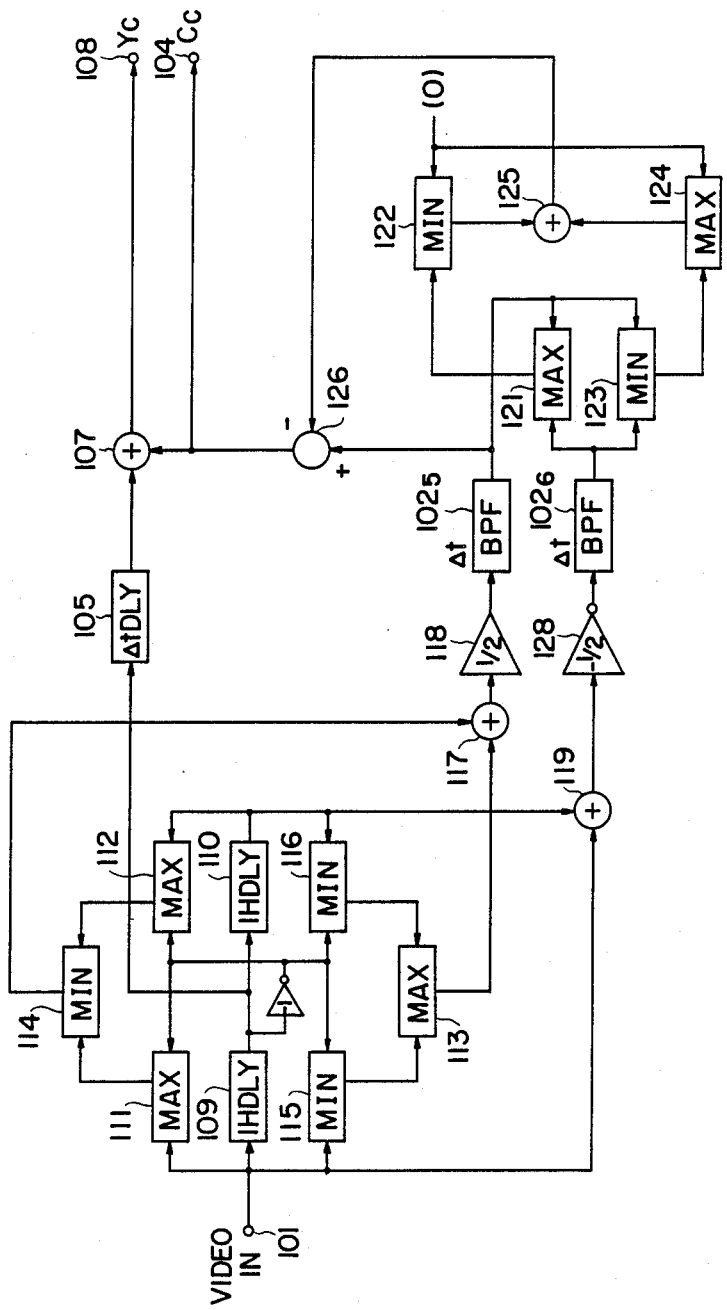
FIG. 17(C) is a block diagram showing a third modification of the YC separator shown in FIG. 13.

In these modifications shown in FIGS. 17(A), (B) and (C), the 1 H delay circuit 106 shown in FIG. 13 can be eliminated by supplying an output of the 1 H delay circuit 109 to the adder 107 via the $\Delta t$ delay circuit 105. In more detail, in FIG. 17(A), a bandpass filter $102_2$ having a $\Delta t$ delay is connected between the 1 H delay circuit 109 and a junction point between the two MIN circuits 115 and 116, a junction point between the two MAX circuits 111 and 112. Further, a bandpass filter $102_3$ having a $\Delta t$ delay is connected between the 1 H delay circuit 110 and a junction point between the MAX circuit 112 and the MIN circuit 116. In FIG. 17(B), a bandpass filter $102_4$ having a $\Delta t$ delay is connected between the subtracter 126 and the adder 107. In FIG. 17(C), a bandpass filter $102_5$ having a $\Delta t$ delay is connected between the $\frac{1}{2}$ circuit 118 and a junction point between the MAX circuit 121 and the subtractor 126. Further, a bandpass filter $102_6$ having a $\Delta t$ delay is connected between the $-\frac{1}{2}$ circuit 128 and a junction point between the MAX circuit 121 and the MIN circuit 123.

Further, where the above-mentioned embodiments and modifications are applied to a PAL system, 2 H delay circuits are used instead of the 1 H delay circuits.

As described above, in the YC separator according to the present invention, since it is possible to obtain chrominance signals including much less unnecessary signal components by the arithmetic circuit on the basis of chrominance signal including error components and the average signals between the past and future line chrominance signals, when a picture of vertical stripes in which black and white lines are alternately arranged such as multiburst is displayed, it is possible to eliminate cross-color at the upper and lower ends of the picture and the YC signal blur, thus providing a high picture quality.

What is claimed is:

1. A YC separator for a video signal processing circuit, comprising:
   (a) a first circuit (102) for separating a chrominance signal A from a composite video signal;
   (b) a second circuit (103), responsive to said first circuit, for generating a past line chrominance signal A, a present line chrominance signal B and a future line chrominance signal C and generating a chrominance signal Cc' including less unnecessary components on the basis of the three past, present and future line chrominance signals A, B and C;
   (c) third circuit means (119, 120), responsive to said second circuit, for generating an average signal D of the past and future line chrominance signals A and C;
   (d) fourth circuit means (121-125), responsive to said second and third circuits, for generating a lower level signal of the average signal D and the chrominance signal Cc" when the average signal D is the same in sign as the chrominance signal Cc', but a zero-level signal irrespective of levels of these two signals when these two signals are different in sign from each other; and
   (e) fifth circuit means (126), responsive to said second and fourth circuits, for generating a chrominance signal Cc including much less unnecessary components by subtracting either one of the lower or zero level signal from the chrominance signal Cc' including less unnecessary components.

2. The YC separator for a video signal processing circuit of claim 1, wherein said fourth circuit means comprises:
   (a) a first MAX circuit (121) for outputting one higher potential signal of the average signal D and the chrominance signal Cc';
   (b) a first MIN circuit (123) for generating one lower potential signal of the average signal D and the chrominance signal Cc';
   (c) a second MIN circuit (122) for generating one lower potential signal of an output of said first MAX circuit and a zero level;
   (d) a second MAX circuit (124) for generating one higher potential signal of an output of said first MIN circuit and the zero level; and
   (e) an adder (125) for adding two outputs of said second MAX and MIN circuits, an added signal being subtracted from the chrominance signal Cc' to obtain the chrominance signal Cc.

3. The YC separator for a video signal processing circuit of claim 1, wherein said fourth circuit means comprises:
   (a) a first MAX circuit (127) for generating one higher potential signal of the chrominance signal Cc' and a zero level;
   (b) a second MAX circuit (129) for generating one higher potential signal of the average signal D and the zero level;
   (c) a third MAX circuit (130) for generating one higher potential signal of the chrominance signal Cc' and the average signal D; and
   (d) a first MIN circuit (131) for generating one lowest potential signal of three outputs of said first, second and third MAX circuits, an output signal of said first MIN circuit being subtracted from the chrominance signal Cc' to obtain the chrominance signal Cc.

* * * * *